United States Patent [19]

Sakamoto et al.

[11] 4,175,506
[45] Nov. 27, 1979

[54] ELECTRIC IGNITION CONTROL SYSTEM

[75] Inventors: Shinichi Sakamoto; Takao Sasayama, both of Hitachi, Japan

[73] Assignee: Hitachi, Ltd., Japan

[21] Appl. No.: 757,932

[22] Filed: Jan. 10, 1977

[30] Foreign Application Priority Data

Jan. 9, 1976 [JP] Japan .................................. 51/1491

[51] Int. Cl.² .............................................. F02P 5/04
[52] U.S. Cl. .............................................. 123/117 D
[58] Field of Search ........................ 123/117 R, 117 D

[56] References Cited
U.S. PATENT DOCUMENTS

| 3,738,339 | 6/1973 | Huntzinger et al. | 123/117 D |
| 3,919,987 | 11/1975 | Haubner et al. | 123/117 D |

*Primary Examiner*—Charles T. Jordan
*Attorney, Agent, or Firm*—Craig and Antonelli

[57] ABSTRACT

An electric ignition control system for an internal combustion engine has a first pulse generator for producing pulses at each 180° interval of crank shaft revolution, a second pulse generator for delivering a predetermined number of pulses, such as 1800 counts, during each 180° interval, and a read only memory for producing a digital signal representing ignition timing in response to both engine speed and throttle opening. When the first counter circuit has counted the number of the second pulse generator pulses equal to the digital value of the digital signal from the memory, the primary current of an ignition coil applied from a battery to the primary coil thereof is interrupted for producing a high voltage to establish an ignition spark across the gap of a spark plug.

7 Claims, 4 Drawing Figures

ELECTRIC IGNITION CONTROL SYSTEM

IN THE SPECIFICATION

This invention is related to an electric ignition control system for an internal combustion engine, and more particular to an electric ignition control system as generally used in motor vehicles.

In conventional ignition control systems, ignition timing is controlled in accordance with a relationship between the a waveform of an output voltage produced by a pick up coil forming part of a magnetic rotor rotating in timed relationship with the engine crank shaft and the operating level of a switching transistor for detecting the output voltage waveform of the pick up coil and for controlling the primary current of the ignition coil to establish a spark across the spark gap of the spark plug. The voltage waveform of the pick up coil is shifted by the engine speed and the vacuum in the intake manifold in a mechanical way to control the ignition timing. As systems of this type are subject to mechanical failure, it is difficult to control the spark timing with a desired or high degree of accuracy.

It is an object of this invention to provide an improved electric ignition control system having a high degree of accuracy for controlling the ignition timing of an internal combustion engine.

It is another object of this invention to provide an electric ignition control system for controlling ignition timing, which is simple in construction.

In accordance with the present invention, the detecting of the instantaneous position of the rotated engine crankshaft can be accomplished with a high degree of accuracy, since it is possible to produce crankshaft position pulses, each corresponding to a desirable degree of the engine crankshaft revolution, such as 0.1° of the crankshaft revolution. Such crankshaft position pulses are produced by an electric circuit, with the result that each pulse has a desirable degree of accuracy.

A memory circuit delivers an ignition control signal in response to an instantaneous engine driven condition, such as engine speed and the degree of vacuum in the intake manifold or the throttle opening, and when the sum of the crankshaft position pulses reaches a value representing the desirable degree of the crankshaft revolution as determined by comparing this value to the ignition control signal, the primary current for charging the ignition coil is interrupted to create a high voltage which establishes an ignition spark across the spark plug gap. A means for producing crankshaft position pulses comprises a first pulse generating means for producing reference pulses within a predetermined interval, such as 180° of crankshaft revolution, and second pulse generating means for producing a predetermined number of crankshaft position pulse between such reference pulses. It is possible to obtain the crankshaft position pulse having any desirable accuracy, since the predetermined number of crankshaft position pulses may be selected at any desirable value due to the electrical construction of the pulse generating means.

In the drawings

FIG. 3 is a schematic diagram of the second pulse generating circuit of FIG. 1.

Figure 1:
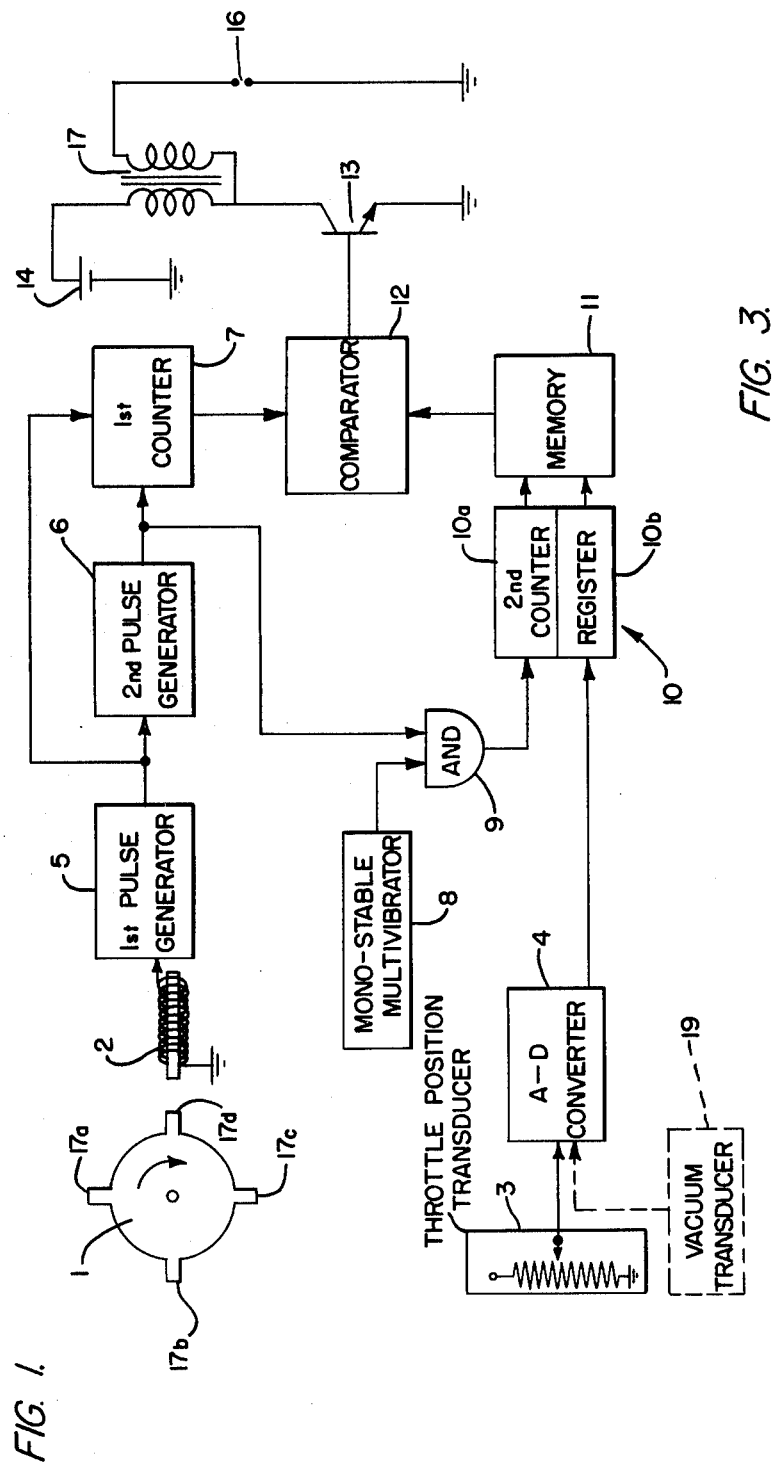
FIG. 1 is a schematic diagram of an embodiment of an electric ignition control system in accordance with the present invention.

Referring to FIG. 1, a rotor 1 is made of a magnetic material such as steel and has four equally angularly spaced radially projecting timing fingers 17a–17d. The rotor is connected to the engine crankshaft (not shown) to rotate in synchronism with the engine, but at half the speed thereof. A magnetic pick up device 2 comprises a magnetic core for establishing magnetic flux passing therethrough a pick up coil to detect a variation of the magnetic flux caused by the rotated fingers 17a, 17b, 17c, and 17d of the rotor 1.

A first pulse generator 5 provided in the form of a switching means, such as a monostable multivibrator, generates a series of reference pulses as shown in FIG. 2(b) in response to the output as shown in FIG. 2(a) from the magnetic pick up device 2, the series reference pulses being produced within each 180° interval of the crankshaft revolution A second pulse generator 6 generates a predetermined number of crankshaft position pulses, such as 180°, during a predetermined period of crankshaft revolution defined by the series of reference pulses. In this case the predetermined crankshaft revolution is 180° which is determined by the reference pulse producing interval. An input and reset terminal of a counter 7 are connected to the output of the second pulse generator 6 and to the outpt of the first pulse generator 5, respectively so that the counter 7 is reset by the reference pulses of the first pulse generator 5 and advanced by the crankshaft position pulses from the second pulse generator 6.

The input terminals of an AND gate 9 are connected to the output terminals of monostable mutivibrator 8 and the second pulse generator 6, respectively, and the AND gate 9 is opened by a constant duration pulse from the monostable multivibrator 8 for passing the crankshaft position pulses from the second pulse generator 6 to a second counter 10a detecting the instantaneous engine speed.

A transducer 3 comprises a variable resistor whose resistance is varied in accordance with the throttle position or throttle opening and delivers a analog signal to an analog-digital converter 4 for generating a digital signal representing the throttle position. A memory operating device 10 for selecting a read out address of a memory 11 comprises the second counter 10a for detecting engine speed, and a register 10b for storing the throttle position. An ignition timing signal in digital form defined by the engine driven condition, such as the engine speed and the throttle position, is applied to a comparator 32 from the memory 11. When the counted value produced by the first counter 7 reaches the level of the output signal of the memory 11, a transistor 13 is turned off by the output of comparator 12 for interrupting the primary current of an ignition coil 17 to produce a high voltage across spark gap 16 of a spark plug.

Figure 2:
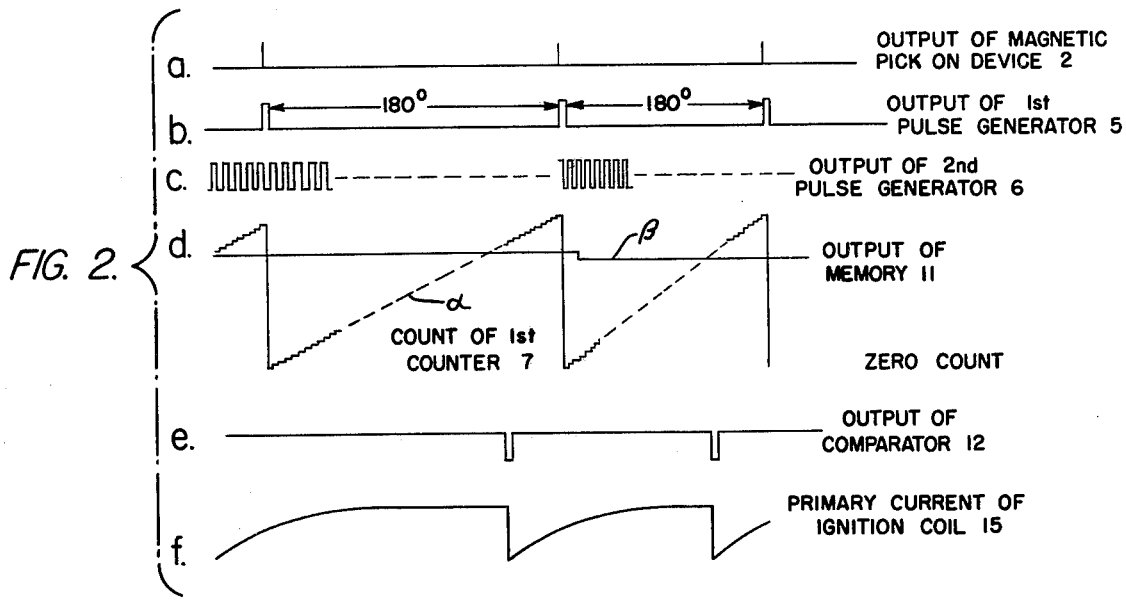
FIG. 2 is a diagram showing the waveform of the signal produced at various portion of the circuit shown in FIG. 1.

Referring to FIG. 1 and FIG. 2, operation of such circuit is explained as follows.

The electric ignition control system of FIG. 1 is used, for example in a four cycle four cylinder engine, and the ignition timing is controlled in response to both the engine speed and the throttle position. In this case, it is necessary to produce an ignition spark within each 180° degree period of the crankshaft revolution. The magnetic pick up device 2 detects the rotor fingers 17a, 17b, 17c and 17d which are provided at a period of 180° crankshaft revolution angle and outputs a series of signals as shown in FIG. 2(a) within the 180° interval. The first pulse generator 5 generates a series of pulses having the period of 180° of crankshaft revolution as shown in FIG. 2(b) in response to the output of the magnetic pick up device 2.

The second pulse generator 6 outputs 1800 pulses as shown in FIG. 2(c) during each period of the 180° crankshaft revolution, which is applied to the counter 7 for detecting the instantaneous crank angle of the engine. The counter 7 has a clear or reset input, connected to the output of the first pulse generator 5, which clears the counter to zero in response to the pulses as shown in FIG. 2(b), and has another input connected to the output of the second pulse generator 6 for advancing the count with the pulses as shown in FIG. 2(c) to 1800. Each pulse from the second pulse generator 6 as shown in FIG. 2(c) represents 0.1 degree of crankshaft revolution, since the second pulse generator always delivers 1800 crankshaft position pulses during the 180 degree period of crankshaft revolution. The counting operation of the counter 7 is shown in FIG. 2(d) and an instantaneous counting value of the counter 7 represents an instantaneous crankshaft revolution, since each input pulse of the counter 7 applied from the second pulse generator 6 corresponds to a predetermined degree such as 0.1 degree of the crankshaft revolution.

The monostable multivibrator 8 produces a constant time duration pulse which is applied to the AND gate 9 for opening the gate 9 and passing crankshaft position pulses from the second pulse generator 6 to counter 10a. The counter 10a detects the instantaneous engine speed by counting the crankshaft position pulses during the predetermined time duration of the output of the monostable multivibrator 8.

The transducer 3 produces an analog signal corresponding the throttle position, which is converted into a digital signal by the analog digital convertor 4, and the digital value 6 stored in the register 10b. A read out address of the memory 11 is selected by both the engine speed detected by the counter 10a and the throttle position stored by the register 10b. The digital signal corresponding to both the engine speed and the throttle position is converted to an analog value and read out from the memory 11 to the comparator 12, such signal being shown by $\beta$ in FIG. 2(d).

When the counted value of the counter 7 advanced by the crankshaft position pulses of the second pulse generator 6 becomes equal to the output of the memory 11, the comparator 12 generates a pulse output as shown in FIG. 2(e). A transistor 13 is biased to conduction in the absence of the pulse of the comparator 12, and accordingly, a charge current passes through the primary winding of ignition coil 15 from battery 14. The output of the comparator 12 switches off the transistor 13 interrupting the charge current of the ignition coil 15, as seen in FIG. 2(f), to produce a high voltage applied to the spark plug gap 16.

In the above case, since each crank position pulse of the second pulse generator 6 corresponds to 0.1 degree of the crankshaft revolution and the instantaneous crankshaft revolution is detected by counting such crank position pulses, the ignition spark timing can be controlled with a desirable accuracy.

In the above case, the engine driving condition for selecting the read out address of the memory is determined by both the engine speed and the throttle position; however, it is possible to determine the engine driving condition on the basis of the degree of vacuum in the intake manifold rather than throttle position. In such case, an analog signal from a vacuum transducer 19 is applied to the analog digital converter 4 as a substitute for the analog signal from the throttle position transducer 3.

Figure 4:
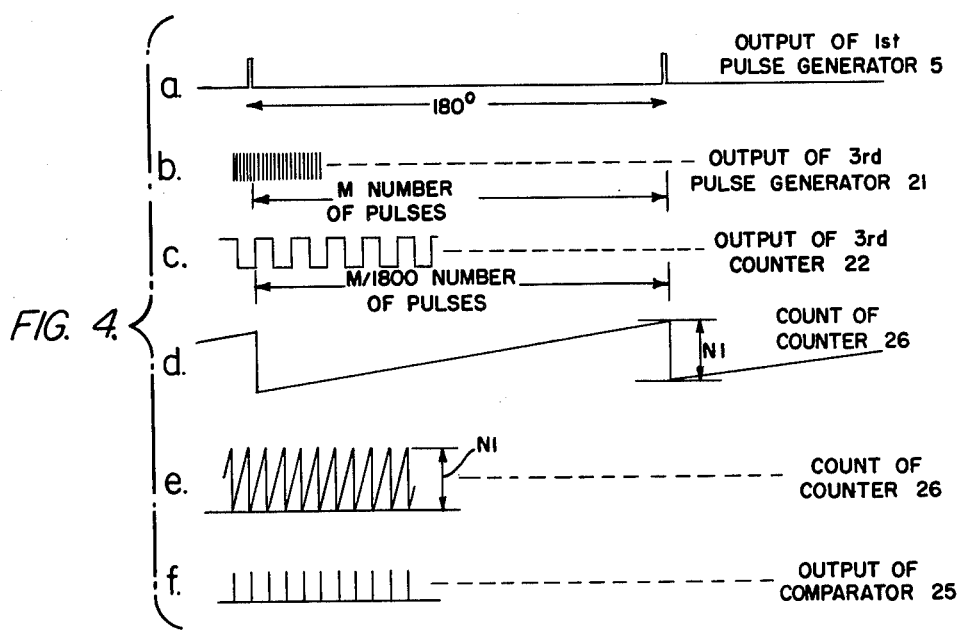
FIG. 4 is a diagram showing the waveform of the signals produced at various portions of the circuit of FIG. 3.

Referring to FIG. 3, which is a block diagram of a preferred embodiment of the second pulse generator 6 of FIG. 1, a pulse generator 21 outputs pulses as shown in FIG. 4(b) having a high frequency than that of the first pulse generator 5 of FIG. 1, the output pulses of the first pulse generator 5 being shown in FIG. 4(a). A third counter 22 is advanced by the series of clock pulses from the pulse generator 21 to a predetermined count such as 1800, whereupon it resets itself and applies an output to a fourth counter 23 which is advanced one count, as shown by FIG. 4(d). A latch circuit or register 24 stores the counted digital value received from the fourth counter 23 in response to the output of the first pulse generator 5 whereupon the fourth counter 23 clears to zero.

A counter 26 is also advanced by the clock pulses of the third pulse generator 21 and, when the count thereof, as shown by FIG. 4(e), becomes equal to the stored value of the register 24, a second comparator 25 outputs one pulse, as shown by FIG. 4(f), and the counter 26 is reset for restarting the count operation. When the counted value of the counter 26 again becomes equal to the stored digital value of the register 24, the comparator again outputs one pulse, and so forth. In one cycle in response to the reference pulse of the first pulse generator 5 the comparator 25 outputs a predetermined number of pulses, in this embodiment 1800 pulses.

At first, the fourth counter 23 is cleared to zero by the reference pulses of the first pulse generator 5, which is applied to the clear input of the fourth counter 23 with in the 180° period of crankshaft revolution. The higher frequency pulse of the third pulse generator 21 is always applied to the third counter 22. When the third counter 22 is advanced to a predetermined value, such as 1800 one pulse is outputted to the fourth counter 23. Namely, the third counter 2 has a predetermined counter cycle for counting a predetermined number, in this embodiment 1800, and when the counter cycle of the third counter 2 is concluded at a count of 1800 pulses, the fourth counter 23 is advanced one count and the third counter 22 is started again. When the next reference pulse of the first pulse generator 5 is delivered, the counted digital value of the fourth counter 23 is set into the register or latch circuit 24, and the counter 23 is reset for starting the count again.

As the pulse output of the third pulse generator 21 has a constant frequency, the digital value set into the register 24 from the fourth counter 23 is varied in response to engine speed variation. It is now assumed that the first pulse generator outputs M number of pulses during each 180° period of crankshaft revolution. Since the count cycle of the counter 22 is completed by a 1800 count, a number N1 of output pulses of the third counter 22 is obtained by $$N1 = M/1800 \tag{1}$$

Therefore the value N1 is set into the register 24.

The output pulses of the third pulse generator 21 are applied to the counter 26 and, when the counted value reaches the digital value set into the register 24, the comparator outputs one pulse as shown by FIG. 4(f) and the counter 24 is reset. Such operation is always repeated. Therefore the comparator outputs 1800 pulses every 180° period of crankshaft revolution.

During the last cycle of the 180° period of crankshaft revolution the digital value N1 to be set into the register 24 is determined, and during the next 180° period of crankshaft revolution, the comparator 25 provides an output in response to both the count of the counter 26 and such set digital value as stored in register 24. During this 180° period of crankshaft revolution, the new digital value N1 is determined in response to the new engine speed.

In the above explanation it is assumed that the engine speed of the last 180° period of crankshaft revolution is equal to that of the next 180° period of crankshaft revolution. As the actual engine speed is frequently changed, the number of output pulses of the comparator 25 every crankshaft revolution cycle is varied by variation of engine speed. But the variation of such number of the outputs pulses is negligble, since the operation of the ignition control system of FIG. 1 is rapid in comparison with the time constant of engine speed variation.

In accordance with the present invention, it is possible to control the ignition timing with high accuracy, and the structure of the ignition control system is simple as well as economical to manufacture.

We claim:

1. In an ignition control system comprising:
an ignition coil for producing high voltage so as to create an ignition spark in the gap of a spark plug;
switching means to produce or interrupt an energizing current through the ignition coil;
a memory for storing data relating to the ignition timing corresponding to at least one engine driven condition;
detecting means to detect an engine drive condition;
memory driving means responsive to the signals representing an engine drive condition from said detecting means for generating an address signal corresponding to such engine drive condition, said address signal being applied to said memory to read out selected ignition timing data;
means for detecting an instantaneous crankshaft position; and
comparator means for controlling said switching means so as to interrupt the energizing current of the ignition coil when the instantaneous crankshaft position becomes equal to the output of said memory;
the improvement characterized in that the instantaneous crankshaft position detecting means comprises
first pulse generator means for producing series reference pulses with a predetermined interval of the crankshaft revolution;
second pulse generator means for producing a predetermined number of crankshaft position pulses during the predetermined interval, said each pulse corresponding to a predetermined degree of the interval of the crankshaft revolution; and
first counting means for counting the crankshaft position pulses to apply the instantaneous crankshaft position signal to said comparator means;
said second pulse generating means including:
third pulse generating means for generating series pulses of a predetermined constant frequency which is higher than that of the reference pulses from the first pulse generator means and the crankshaft position pulses from the second pulse generator means;
second counting means having a counting cycle for counting a predetermined number of pulses, the second counting means outputting one pulse and being resumed itself to start count again when the predetermined number of the series pulse from the third pulse generating means has been received;
third counting means for counting the series pulses from the third pulse generating means, which has a reset terminal to clear the count of said third counting means to zero;
fourth counting means for counting the output of the second counting means; and
second comparator means for outputting pulses to the first counting means when the count of the third counting means reaches the output digital value of the fourth counting means.

2. An ignition control system according to claim 1 the engine driven condition detecting means including, speed detecting means for detecting engine speed and means for detecting throttle position.

3. An ignition control system according to claim 1, the engine driven condition detecting means including, means for detecting engine speed and means for detecting vacuum of an intake/manifold of the engine.

4. An ignition control system for an internal combustion engine comprising means responsive to an ignition control signal for generating a high voltage capable of creating a spark across the gap of a spark plug; condition control means responsive to at least one predetermined operating condition of said engine for providing a selected ignition timing signal preselected according to said condition; position detecting means responsive to the instantaneous engine crankshaft position for generating a crankshaft position signal; and comparator means for generating said ignition control signal when said crankshaft position signal corresponds to said ignition timing signal; said position detecting means comprising first pulse generator means for producing a series of reference pulses within a predetermined interval of the crankshaft revolution, second pulse generator means responsive to said first pulse generator means for producing a predetermined number of crankshaft position pulses each corresponding in time to a predetermined degree of the interval of the crankshaft revolution, and first counting means for producing said crankshaft position signal by counting the crankshaft position pulses from said second pulse generator means; said condition control means including memory means for storing a plurality of ignition timing signals corresponding to respective operating conditions of the engine, condition detecting means for detecting predetermined operating conditions of said engine, and memory driving means responsive to said condition detecting means for reading a selected ignition timing signal from said memory means.

5. An ignition control system according to claim 4, wherein said second pulse generating means includes:
third pulse generating means for generating a series of pulses of a predetermined constant frequency which is higher than that of the reference pulses from said first pulse generator means and the crankshaft position pulses from said second pulse generating means;

second counting means having a counting cycle for counting a predetermined number of pulses for outputting one pulse each time said predetermined number of the series of pulses from said third pulse generating means has been received;

third counting means for counting the series pulses from the third pulse generating means;

fourth counting means for counting the output of said second counting means; and second comparator means for outputting one pulse to said first counting means when the count of said third counting means reaches the output digital value of said fourth counting means.

6. An ignition control system according to claim 4, wherein said condition control means includes speed detecting means for detecting engine speed and means for detecting engine throttle position.

7. An ignition control system according to claim 4, wherein said condition control means includes speed detecting means for detecting engine speed and means for detecting the degree of vacuum in the intake manifold of the engine.

* * * * *